Figure 1:
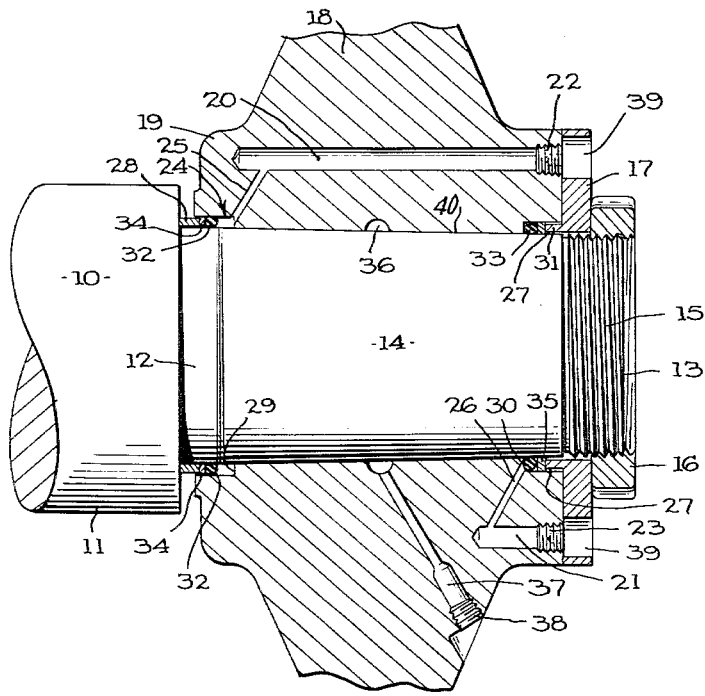

INVENTOR
ROBERT E. SILLETT
BY Cameron, Kerkam & Sutton
ATTORNEYS

United States Patent Office 3,228,102
Patented Jan. 11, 1966

3,228,102
HYDRAULIC ASSEMBLY AND DISASSEMBLY OF PARTS HAVING A HEAVY INTERFERENCE FIT
Robert E. Sillett, Connersville, Ind., assignor to Dresser Industries, Inc., Dallas, Tex., a corporation of Delaware
Filed Oct. 21, 1963, Ser. No. 317,413
7 Claims. (Cl. 29—252)

This invention relates generally to means for assembling and disassembling mating parts which have a heavy intereference fit, and more particularly to an improved arrangement of hydraulically actuated means for making and unmaking longitudinal press-fit connections between shafts and machine elements which are carried thereby.

In prior art arrangements for making an interference fit connection between a shaft and an outer element, such as a gear or wheel, it is customary to use hydraulically actuated equipment, such as presses and gear pullers, for seating the outer element tightly on the shaft and for breaking it loose therefrom. However, known devices of this type are of relatively large size and complicated construction, and often cannot be used to advantage, as when heavy machinery is located in relatively isolated or inaccessible locations.

A principal object of the present invention is to provide a compact, structurally simple arrangement of hydraulically actuated means which can be conveniently operated to assemble and disassemble mating parts which have a heavy interference fit.

Another object is to provide jacking means of novel construction, operable by hydraulic pressure developed by a conventional pump, for making and breaking interference fit connections between rotatable machine parts, such as shafts and wheel-like elements mounted thereon.

A further object is to provide an improved hydraulically operable device for assembling and disassembling parts having a heavy interference fit which is relatively inexpensive to manufacture, embodies a minimum of parts, and is of simple, rugged construction so as to require a minimum of maintenance and repair.

In the embodiment herein illustrated and described, by way of example, the invention is applied to the assembly and disassembly of a gear and a shaft of a power driven rotary pump or blower. Hydraulic cylinders and pistons are incorporated in each end of the hub of the gear or outer mating element so that the gear can be seated on the shaft or inner element by supplying hydraulic pressure to one of the cylinders, and can be removed by supplying hydraulic pressure to the other cylinder. An annular groove is also provided in the inner surface of the gear hub intermediate its ends to which hydraulic pressure may be supplied to assist in pulling off the gear in case of failure of the seal in the hydraulic cylinder normally used for unseating the gear.

Although only one specific form of the invention is described and illustrated in the accompanying drawings, it is to be expressly understood that these drawings are for the purpose of illustration only and are not intended to represent the full scope of the invention which is defined by the appended claims.

Figure 2:
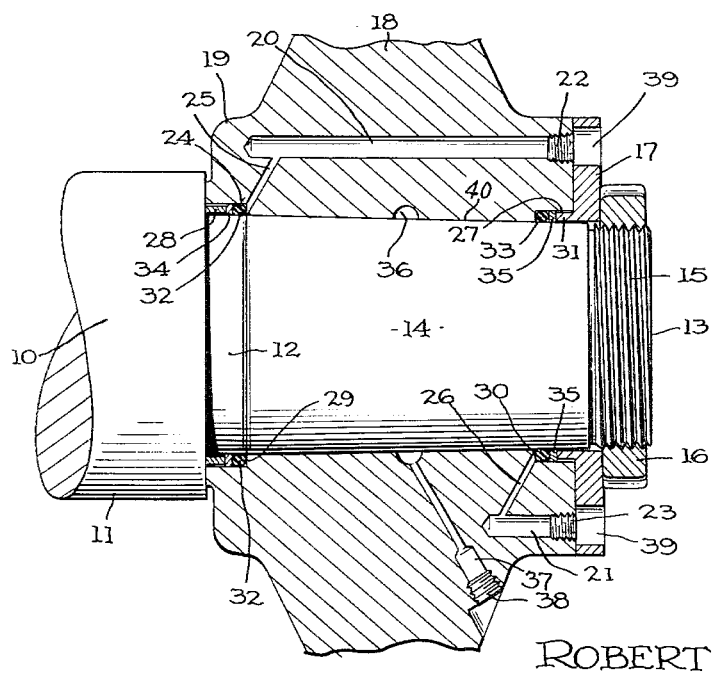

In the drawings, wherein like reference characters indicate like parts throughout the several views, FIGS. 1 and 2 are fragmentary axial sectional views of a gear hub and shaft assembly embodying the present invention, FIG. 1 showing the hub in partially seated position on the shaft, while FIG. 2 shows the parts in fully assembled position.

In general, the invention comprises the combination of a shaft, an interference-fitted outer element such as a gear, and a simplified hydraulic jack arrangement for pressing the gear onto and off of the shaft. To this end, the hub of the gear is provided with readily accessible passages which communicate with hydraulic jack cylinders positioned at both ends of the hub. The hub bore and the cooperating portion of the shaft are complementarily tapered to provide an interference fit obtained by axial movement of the hub on the shaft. By connecting a hydraulic pump to the passage which leads to the cylinder at the outer end of the hub, a pressure may be applied which pushes the hub axially along the tapered shaft to firmly seat the hub thereon. For disassembly of the parts, the other passage is connected to the pump which thus applies the required pressure to the cylinder at the inner end of the hub and slides the hub outwardly off the shaft.

Referring now to FIGS. 1 and 2, the structure illustrated therein is intended to represent a shaft 10 of one rotor of a large capacity blower of the rotary positive displacement type and a timing gear 18 adapted to be fixed to the shaft. As shown, the shaft 10 has a large diameter cylindrical portion 11, an adjacent intermediate diameter cylindrical portion 12, a small diameter cylindrical end portion 13, and a tapered seating portion 14 connecting cylindrical portions 12 and 13. The small diameter cylindrical end portion 13 is threaded as shown at 15 to receive a lock nut or clamp plate 16 which serves to block movement of an outer annular piston 17 when gear 18 is being seated on shaft portion 14 by the application of hydraulic pressure in the manner hereinafter described.

Gear 18 comprises a hub 19 having a tapered central bore 40 which is adapted to be mounted on the tapered seating portion 14 of shaft 10 with an interference fit. Hub 19 is provided with a pair of axially extending passages 20 and 21 having internally threaded ends 22 and 23, respectively, at the outer face of the hub for receiving a suitable fitting for connection to a source of hydraulic pressure, such as an oil pump (not shown).

Passage 20 extends almost the full axial width of hub 19 and communicates with a hydraulic jack indicated generally at 24 through a connecting channel 25 of reduced diameter. Passage 21 extends into the hub 19 only a relatively short distance and communicates through a connecting channel 26 with a second hydraulic jack indicated generally at 27.

Hydraulic jacks 24 and 27 comprise cylinders in the form of counterbored annular recesses 29 and 30, respectively, extending inwardly from the ends of hub 19, and annular pistons 28 and 17 mounted in the outer ends of recesses 29 and 30, respectively. Piston 28 is in the form of a sleeve mounted on the intermediate diameter cylindrical portion 12 of shaft 10, and is seated against the large diameter cylindrical portion 11 which serves to block outward movement of the piston relative to recess 29, i.e., to the left as viewed in FIGS. 1 and 2 when hydraulic pressure is applied to jack 24. Piston 17 has an annular body of substantially the same inner and outer diameters as hub 19 which abuts the outer face of said hub and which is provided with a flange portion 31 extending into the recess 30 and mounted on the outer end of tapered portion 14 of the shaft. Each of pistons 17 and 28 has an inside diameter slightly greater than that of the portion of the shaft on which the piston is mounted, rubber O rings 32 and 33 being positioned inboard of the pistons in recesses 29 and 30 in order to provide hydraulic pressure seals. If desired, a pair of back-up rings 34 and 35 may be provided between piston 28 and O ring 32 and between the flange 31 of piston 17 and O ring 33, respectively, to increase the effectiveness of the pressure seals.

When the gear 18 is to be assembled with the shaft 10, the hub 19 of the gear is pushed onto the portion 14 of the shaft until there is metal to metal contact between the complemenary tapered surfaces of the hub bore 40 and the shaft portion. The outer piston 17 is then placed on the outer end of the shaft in abutment with the outer face of hub 19 and is blocked against outward movement by means of lock nut 16, as shown in FIG. 1, and a hydraulic pump is connected to the oil passage 21 through an opening 39 in the body of the piston. When hydraulic pressure is then applied to hydraulic jack 27 via passage 21 and channel 26, the hub is forced axially up the tapered shaft portion 14 by the pressure exerted against the closed inner end of recess 30 until the inner face of the hub abuts the end of the large diameter cylindrical portion 11 of the shaft, as shown in FIG. 2, at which time the gear is fully seated on the shaft. The pressure supplied to jack 27 also serves the additional purpose of opening the hub bore slightly and providing lubrication so as to facilitate axial movement of the hub along the shaft. The source of hydraulic pressure is then disconnected from passage 21 and the nut 16 tightened on the threaded shaft portion 13 to hold the gear and shaft in asembled position.

Disassembly of the parts and removal of gear 18 from the shaft 10 may be accomplished by first loosening the lock nut or clamp plate 16, and then applying hydraulic pressure to the jack 24 through passage 20 and channel 25 so as to break the gear loose from its seated position and move it axially toward the threaded portion 15 of the shaft. It should be readily apparent that only a slight movement is necessary to unseat the gear from the shaft due to the complementary tapered surfaces of the hub bore 40 and shaft portion 14.

While the arrangement thus far described provides a simple, rugged and effective construction for assembling and disassembling interference fitted gears and shafts, means are also provided for preventing permanent locking of the gear to the shaft in the event that O ring 32 should fail or be defective and thus destroy the pressure seal in hydraulic jack 24, thereby preventing disassembly or unseating of the gear from the shaft in the manner above described. To this end, an annular groove 36 is formed in the inner surface of the bore 40 of hub 19, positioned approximately midway between the ends of the hub, and a passage or channel 37 is provided which extends through the hub 19 from the outer face of gear 18 and communicates with the groove 36. The outer end of passage 37 is internally threaded at 38 for connection to a source of hydraulic pressure in the same manner as passages 20 and 21. With this construction, should O ring 32 fail to seal the hydraulic jack 24 tightly enough to permit a sufficient pressure build-up in cylinder 29 to unseat the gear, passage 37 may be connected to the source of hydraulic pressure so as to supply pressure to annular groove 36. Such pressure will expand the bore 40 of hub 19 sufficiently to enable removal of the gear from the shaft with a conventional pulling device.

From the foregoing description, it is apparent that there is provided by the present invention a mechanically rugged yet relatively simple and effective hydraulic means for effecting the assembly and disassembly of parts having a heavy interference fit. Although only one particular embodiment of the invention has been described, it will be obvious to those skilled in the art that the inventive concept is capable of a variety of mechanical modifications. It is therefore intended by the appended claims to cover all such modifications which fall within the true scope of the invention.

What is claimed is:

1. In an arrangement for assembling and disassembling machine parts having a heavy interference fit, the combination of a tapered shaft, an outer element having a hub with a tapered bore adapted to be seated on said shaft with an interference fit therebetween, an annular recess at one end of said hub extending into and enlarging said bore, an annular piston mounted on said shaft adapted to extend into said recess and forming with the walls of said recess and the surface of said shaft a hydraulic jack, a passage in said hub in communication with said recess, said passage being adapted to supply hydraulic pressure to said jack to move the outer element axially along said shaft, and means on said shaft for blocking movement of said piston relative to the shaft when hydraulic pressure is supplied to said jack.

2. In an arrangement for assembling and disassembling machine parts having a heavy interference fit, the combination of a tapered shaft, an outer element having a hub with a tapered bore adapted to be seated on said shaft with an interference fit therebetween, an annular recess at one end of said hub extending into and enlarging said bore, an annular piston mounted on said shaft adapted to extend into said recess and forming with the walls of said recess and the surface of said shaft a hydraulic jack, a passage in said hub in communication with said recess, said passage being adapted to supply hydraulic pressure to said jack to move the outer element axially along said shaft, means on said shaft for blocking movement of said piston relative to the shaft when hydraulic pressure is supplied to said jack, an annular groove formed in the inner surface of the bore of said hub intermediate the ends thereof, and another passage in said hub in communication with said annular groove, said other passage being adapted to supply hydraulic pressure to said groove to facilitate movement of said outer element along said shaft.

3. In an arrangement for assembling and disassembling machine parts having a heavy interference fit, the combination of a tapered shaft, an outer element having a hub with a tapered bore adapted to be seated on said tapered shaft with an interference fit therebetween, annular recesses at the opposite ends of said hub extending into and enlarging said bore, a pair of annular pistons mounted on said shaft at the opposite ends of said hub and forming with the walls of said recesses and the surface of said shaft a pair of hydraulic jacks, a first passage in said hub in communication with one of said recesses, a second passage in said hub in communication with the other of said recesses, said passages being adapted to supply hydraulic pressure to said jacks for seating and unseating the outer element on and from said shaft, respectively, and means on said shaft for blocking movement of said pistons relative to the shaft when hydraulic pressure is supplied to said jacks.

4. Means for assembling and disassembling a shaft and an outer element having a hub adapted to be mounted on said shaft with an interference fit between the bore of the hub and the surface of the shaft, comprising a pair of hydraulic jacks positioned at the opposite ends of the hub, each of said jacks including a cylinder formed by a counterbored recess in the end of the hub bore and the adjacent surface of the shaft, and a piston mounted on the shaft closing one end of said cylinder, the other end of each cylinder being closed by the portion of the hub forming the inner end of the recess, the hub being movable axially along the shaft relative to each of said pistons, means for supplying hydraulic pressure to said jacks, and means for blocking movement of said pistons relative to the shaft when hydraulic pressure is supplied to said jacks, whereby the hydraulic pressure is effective to move the hub relative to the shaft.

5. Means for assembling and disassembling a tapered shaft and an outer element having a hub with a tapered bore adapted to be mounted on said shaft with an interference fit between the bore of the hub and the surface of the shaft, comprising a counterbored recess in each end of the hub bore extending inwardly from the adjacent end of the hub, a piston member mounted on the shaft and extending into the outer end of each of said recesses so as to form with said recess and the adjacent surface of the shaft a hydraulic jack, passages in said hub extending from the outer face thereof to said recesses for supplying hydraulic pressure to said jacks, said shaft having a shoulder formed thereon adjacent the inner face of the hub for blocking movement of the piston member of the hydraulic jack at the inner end of the hub when hydraulic pressure is supplied to said jack, and a blocking member adjustably connected to the outer end of the shaft adjacent the outer end of the hub for blocking movement of the piston member of the hydraulic jack at said outer end of the hub when hydraulic pressure is supplied to said jack.

6. The combination defined in claim 5 wherein said blocking member comprises a nut having threaded engagement with the outer end of said shaft.

7. Means for assembling and disassembling a tapered shaft and an outer element having a hub with a tapered bore adapted to be mounted on said shaft with an interference fit between the bore of the hub and the surface of the shaft, comprising a counterbored recess in each end of the hub bore extending inwardly from the adjacent end of the hub, a piston member mounted on the shaft and extending into the outer end of each of said recesses so as to form with said recess and the adjacent surface of the shaft a hydraulic jack, passages in said hub extending from the outer face thereof to said recesses for supplying hydraulic pressure to said jacks, said shaft having a shoulder formed thereon adjacent the inner face of the hub for blocking movement of the piston member of the hydraulic jack at the inner end of the hub when hydraulic pressure is supplied to said jack, a blocking member adjustably connected to the outer end of the shaft adjacent the outer end of the hub for blocking movement of the piston member of the hydraulic jack at said outer end of the hub when hydraulic pressure is supplied to said jack, an annular groove formed in the inner surface of the hub bore intermediate the ends thereof, and a passage in said hub for supplying hydraulic pressure to said annular groove independently of the supply of hydraulic pressure to said jacks.

References Cited by the Examiner
UNITED STATES PATENTS

| | | | |
|---|---|---|---|
| 961,375 | 6/1910 | Seabrook | 29—427 |
| 2,764,437 | 9/1956 | Bratt | 29—427 X |
| 2,959,258 | 11/1960 | Hagemann | 29—427 X |
| 3,033,597 | 5/1962 | Miller | 29—427 X |
| 3,104,459 | 9/1963 | Wendt | 29—252 |
| 3,171,776 | 3/1965 | Hart et al. | 162—369 |

WILLIAM FELDMAN, *Primary Examiner.*

MYRON C. KRUSE, *Examiner.*